No. 789,723. PATENTED MAY 16, 1905.
F. A. FREEMAN.
FASTENING DEVICE.
APPLICATION FILED APR. 1, 1904.

WITNESSES:
Mae Hofmann
Mary Wearsley

INVENTOR
Frank A. Freeman
BY
Jno P Croasdale
ATTORNEY

No. 789,723.

Patented May 16, 1905.

UNITED STATES PATENT OFFICE.

FRANK A. FREEMAN, OF PHILADELPHIA, PENNSYLVANIA.

FASTENING DEVICE.

SPECIFICATION forming part of Letters Patent No. 789,723, dated May 16, 1905.

Application filed April 1, 1904. Serial No. 201,063.

*To all whom it may concern:*

Be it known that I, FRANK A. FREEMAN, a citizen of the United States, residing at Philadelphia, in the county of Philadelphia and State of Pennsylvania, have invented a new and useful Fastening Device, of which the following is a specification.

My invention relates to fastening devices, and is especially adapted for use in connection with hose-supporters, the object of my invention being to afford neat, simple, and efficient fastening means which shall be easily engaged and disengaged, which shall be safely maintained in the coöperative position until manually operated, and which shall lie flat and smooth when in the operative position.

I accomplish my object by the mechanism illustrated in the accompanying drawings, in which—

Figure 1:
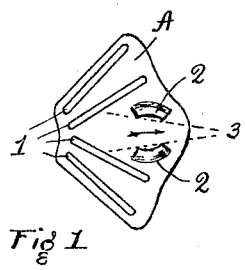
Figure 2:
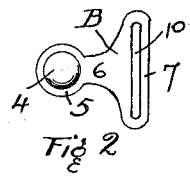
Figure 3:
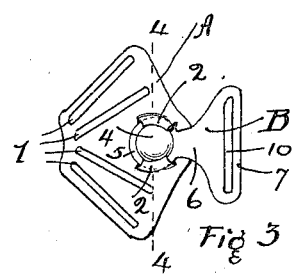
Figure 4:
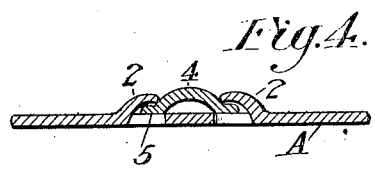
Figure 5:
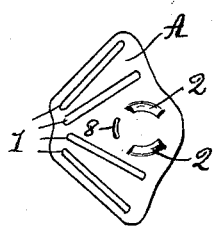
Figure 6:
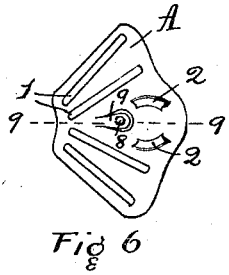
Figure 7:
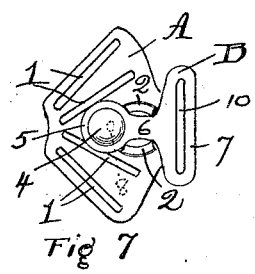
Figure 8:
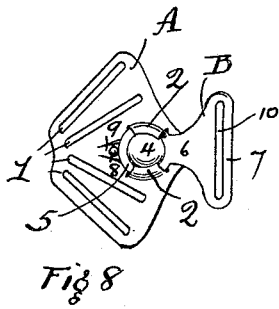
Figure 9:
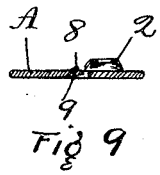

Figure 1 is a plan view of one form of member A of my device. Fig. 2 is a similar view of member B of my device. Fig. 3 is a similar view of members A and B in the operative position. Fig. 4 is a sectional view, enlarged, on line 4 4 of Fig. 3. Fig. 5 is a plan view of a modification of member A. Fig. 6 is a similar view of another modification of member A. Fig. 7 is a similar view of member A as shown in Fig. 6 with member B in the preliminary position just before being drawn into the operative position. Fig. 8 is a similar view showing A and B in the operative positions. Fig. 9 is a sectional view on lines 9 9 of Fig. 6.

Similar characters refer to similar parts throughout the several views.

The member A, as shown in Fig. 1, is in the form of a flat piece provided with slots 1 for engaging the web or garter to which it is attached. The segmental lips 2 are struck up slightly from member A and are oppositely disposed and symmetrical with respect to each other. The lines intersecting the two ends of the arc-shaped margins of these lips 2 are slightly convergent, as indicated by the dotted lines 3.

The member B, as shown in Fig. 2, has a similar slot 10 for engagement with the web and a flattened concavo-convex head 4 with a flat circular margin 5. The sides of this concavo-convex head are adapted to pass under the lips 2 of member A from the broader opening and to be drawn toward said lips in the direction of the arrow. (Shown in Fig. 1.) The lips, as shown in the drawings, are segmental in form and also concavo-convex to conform with the contour of the concavo-convex head 4. It follows from the formation of the coöperating parts as above described that due to the spring of the metal of plate A said lips 2 are usually sufficient to maintain said head in engagement therewith when the head is drawn under the same, as above described.

The neck 6, joining the head part 4 of member B with the loop part 7, is slightly less in extension than the narrower space between the ends of the lips 2. The margins of lips 2 are in the arcs approximately of the same circle which corresponds to the portion of the sphere formed by the convexed head 4 of member B. It follows that a certain free relative rotative movement is permitted between members A and B, while said head 4 of member B is held in engagement with the lips 2 of member A. It also follows that the proportions of head 4 with its margin 5 and the proportions and positions of the lips 2 are such that while the head may be readily sprung beneath the lips through the wider opening therebetween it is prevented from being drawn free from the lips in the direction of the arrow. This is because of the more contracted opening between said lips being insufficient to permit the head from passing therebetween. As above stated, the spring of the plate and lips is sufficient to maintain the head in the operative position when it has been snapped beneath the lips, yet it is possible with the slight pressure of the hands to release member B from member A by pushing the head 4 oppositely to the direction of the arrow from engagement with said lips 2.

As a further illustration of this device, Fig. 3 shows the head 4 of member B in engagement with the lips 2 of member A, special attention being called to the fact that the width of the neck 6 of member B is slightly less in extension than the distance between the narrower space between the lips 2 to permit of a slight rotation of head 4 with respect to said lips, which results in an independent limited rotative movement between member B and member A. The engagement of the neck with the end of either of lips 2 serves to limit said rotative movement.

In Fig. 5 I show the member A provided with a slight projection or bead 8 struck up from said member A and adapted to coincide with the margin 5 of member B. The result of this construction is that when member B is placed upon member A in the preliminary position, as shown in Fig. 7, this projection 8 lies within the hollow or convex side of head 4 of member B, and therefore does not interfere with the margin 5 of said member B from readily sliding under the lips 2 of member A. After said head 4 and margin 5 have come securely under the lips 2 a further movement of member B toward the operative position causes the margin 5 to encounter the projection 8. The final movement of member B into the operative position causes margin 5 to be drawn over the same into the position shown in Fig. 8 with a certain amount of spring-snap due to the springiness of the metal of said two members.

While the device shown in Fig. 1, as above stated, may usually be sufficient to maintain said members A and B in the coöperative position until manually operated, the addition of the locking projection 8 may be desirable in certain forms of construction of said device, and especially with certain weights or thickness of metal used for the same.

In Fig. 6 I show a further variation of this additional locking means in that the projection 8 is mounted on a spring-tongue 9, which is cut or struck into the metal of plate A. This tongue obviously adds to the ease of facility with which the head 4 of member B may be snapped over said projection 8. The advantage of this form of construction of course may also have reference to the thickness of plate A and the quality of metal used in its construction. In this connection Fig. 8 shows the member A as shown in Fig. 6 and member B in the coöperative position, while Fig. 9 shows a sectional view of member A illustrated in Fig. 6, showing the position in detail of the spring-tongue 9, which is provided with the projection 8.

I disclaim in a clasp of the kind described the combination of a plate bearing a socket formed of two circularly-disposed ways, the sides having their lower ends contracted to form shoulders, and a hook member bearing a head with a flange to engage said ways, substantially as described.

What I claim is—

1. In a fastening device, the combination of two interlocking members, one member having a flattened circular concavo-convex head, the other member provided with oppositely-disposed arc-shaped lips, the one symmetrical with the other, for engaging, near its outer margin, the convex portion of said head therebetween, said lips having their engaging margins substantially corresponding with the engaged convex portion of the head.

2. In a fastening device, the combination of two interlocking members, one member having a flattened circular concavo-convex head, the other member provided with oppositely-disposed convergent arc-shaped lips, the one symmetrical with the other, for engaging, near its outer margin, the convex portion of said head therebetween, said lips having their engaging margins substantially corresponding with the engaged convex portion of the head.

3. In a fastening device, the combination of two interlocking members, one member having a flattened circular concavo-convex head, the other member provided with oppositely-disposed arc-shaped lips, the one symmetrical with the other, for engaging, near its outer margin, the convex portion of said head therebetween, said lips having their engaging margins substantially corresponding with the engaged convex portion of the head, said two members being so proportioned as to permit a limited free relative rotative movement therebetween.

4. In a fastening device, the combination of two interlocking members, one member having a flattened circular concavo-convex head, the other member provided with oppositely-disposed arc-shaped lips, the one symmetrical with the other, for engaging, near its outer margin, the convex portion of said head therebetween, said lips having their engaging margins substantially corresponding with the engaged convex portion of the head and having sufficient spring or resilience normally to maintain their engagement with the head when said members are brought into the operative position.

5. In a fastening device, the combination of two interlocking members, one member having a flattened circular concavo-convex head, the other member provided with oppositely-disposed convergent arc-shaped lips, the one symmetrical with the other, for engaging, near its outer margin, the convex portion of said head therebetween, said lips having their engaging margins substantially corresponding with the engaged convex portion of the head, and having sufficient spring or resilience normally to maintain their engagement with the head when said members are brought into the operative position.

6. In a fastening device, the combination of two interlocking members, one member having a flattened circular concavo-convex head, the other member provided with oppositely-disposed arc-shaped lips, the one symmetrical with the other, for engaging, near its outer margin, the convex portion of said head therebetween, said lips having their engaging margins substantially corresponding with the engaged convex portion of the head, said lip member also provided with a projection adapted to lie under the head of the coöperating member and project into the concave portion thereof when said two members are brought into the preliminary position of engagement and to lie outside the margin of said head when said members are in the final position of engagement.

7. In a fastening device, the combination of two interlocking members, one member having a flattened circular concavo-convex head, the other member provided with oppositely-disposed convergent arc-shaped lips, the one symmetrical with the other, for engaging, near its outer margin, the convex portion of said head therebetween, said lips having their engaging margins substantially corresponding with the engaged convex portion of the head, said lip member also provided with a projection adapted to lie under the head of the coöperating member and project into the concave portion thereof when said two members are brought into the preliminary position of engagement and to lie outside the margin of said head when said members are in the final position of engagement.

8. In a fastening device, the combination of two interlocking members, one member having a flattened circular concavo-convex head, the other member provided with oppositely-disposed arc-shaped lips, the one symmetrical with the other, for engaging, near its outer margin, the convex portion of said head therebetween, said lips having their engaging margins substantially corresponding with the engaged convex portion of the head, said lip member also provided with a spring-mounted projection adapted to lie under the head of the coöperating member and project into the concave portion thereof when said two members are brought into the preliminary position of engagement and to lie outside the margin of said head when said members are in the final position of engagement.

9. In a fastening device, the combination of two interlocking members, one member having a flattened circular concavo-convex head, the other member provided with oppositely-disposed convergent arc-shaped lips, the one symmetrical with the other, for engaging, near its outer margin, the convex portion of said head therebetween, said lips having their engaging margins substantially corresponding with the engaged convex portion of the head, said lip member also provided with a spring-mounted projection adapted to lie under the head of the coöperating member and project into the concave portion thereof when said two members are brought into the preliminary position of engagement and to lie outside the margin of said head when said members are in the final position of engagement.

FRANK A. FREEMAN.

Witnesses:
MAE HOFMANN,
MARY YEARSLEY.